US010263990B2

(12) United States Patent
Son et al.

(10) Patent No.: US 10,263,990 B2
(45) Date of Patent: Apr. 16, 2019

(54) MODE-BASED ACCESS CONTROL METHOD AND DEVICE

(71) Applicant: SAMSUNG ELECTRONICS CO., LTD., Gyeonggi-do (KR)

(72) Inventors: Kyoung-ho Son, Yongin-si (KR); Hyun-gyoo Yook, Seoul (KR); Sung-Min Lee, Suwon-si (KR); Seung-Jae Oh, Seoul (KR); Se-Hee Han, Seoul (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 232 days.

(21) Appl. No.: 14/666,742

(22) Filed: Mar. 24, 2015

(65) Prior Publication Data

US 2015/0195287 A1 Jul. 9, 2015
US 2017/0366552 A9 Dec. 21, 2017

Related U.S. Application Data

(63) Continuation of application No. 11/500,889, filed on Aug. 9, 2006, now Pat. No. 9,000,884.

(30) Foreign Application Priority Data

Aug. 10, 2005 (KR) .................. 10-2005-0073433

(51) Int. Cl.
H04L 29/06 (2006.01)
H04L 12/24 (2006.01)

(52) U.S. Cl.
CPC ........ H04L 63/101 (2013.01); H04L 41/0883 (2013.01); H04L 63/105 (2013.01); H04L 63/20 (2013.01); H04L 41/0893 (2013.01)

(58) Field of Classification Search
CPC ....... G06F 21/31; G06F 21/34; G08B 25/008; G08B 25/14; G08B 13/19682
See application file for complete search history.

(56) References Cited

U.S. PATENT DOCUMENTS 5,224,163 A 6/1993 Gasser
5,276,444 A 1/1994 McNair
(Continued)

FOREIGN PATENT DOCUMENTS

EP 1233602 A1 8/2002
EP 1478128 B1 6/2006
(Continued)

OTHER PUBLICATIONS

Carl Ellison, UPNP Forum: "DeviceSecurity: 1 Service Template", Nov. 17, 2003, XP007900026, Intel Corporation.

Primary Examiner — James J Yang
(74) Attorney, Agent, or Firm — Sughrue Mion, PLLC

(57) ABSTRACT

Provided is a mode-based access control method that includes: making a security mode list which indicates security setting states of devices existing in a home network; setting a specific security mode selected from the modes on the security mode list; and making the devices perform functions thereof in the specific security mode. Also, provided is a mode-based access control device includes: an authentication unit which checks information on a user and authenticates the user; a mode configuration unit which makes a security mode list indicating the security setting state of devices forming a home network; a mode setting unit which sets a specific security mode selected from modes on the security mode list; and an operating unit which causes the devices to perform functions thereof in the specific security mode.

7 Claims, 11 Drawing Sheets

(56) References Cited

U.S. PATENT DOCUMENTS

| | | |
|---|---|---|
| 5,450,593 A | 9/1995 | Howell et al. |
| 5,510,777 A | 4/1996 | Pilc et al. |
| 5,764,890 A | 6/1998 | Glasser et al. |
| 6,426,705 B1 | 7/2002 | Wischoeffer |
| 6,504,480 B1 | 1/2003 | Magnuson et al. |
| 6,944,430 B2 | 9/2005 | Berstis |
| 7,046,139 B2 | 5/2006 | Kuhn et al. |
| 7,117,051 B2* | 10/2006 | Landry ............... H04L 12/2818 700/83 |
| 7,280,030 B1 | 10/2007 | Monaco |
| 7,380,279 B2 | 5/2008 | Prokupets et al. |
| 2002/0180579 A1* | 12/2002 | Nagaoka ............. H04L 12/2803 340/3.1 |

FOREIGN PATENT DOCUMENTS

| | | |
|---|---|---|
| JP | 2000-347970 A | 12/2000 |
| JP | 2001-103078 A | 4/2001 |
| JP | 2001-251312 A | 9/2001 |
| JP | 2003-69595 A | 3/2003 |
| JP | 2003-289587 A | 10/2003 |
| JP | 2004-21666 A | 1/2004 |
| JP | 2004-30133 A | 1/2004 |
| JP | 2005-149377 A | 6/2005 |
| KR | 10-2003-0073807 A | 9/2003 |
| WO | 02/03215 A1 | 1/2002 |
| WO | 02/28083 A1 | 4/2002 |
| WO | 2004/008686 A1 | 1/2004 |

* cited by examiner

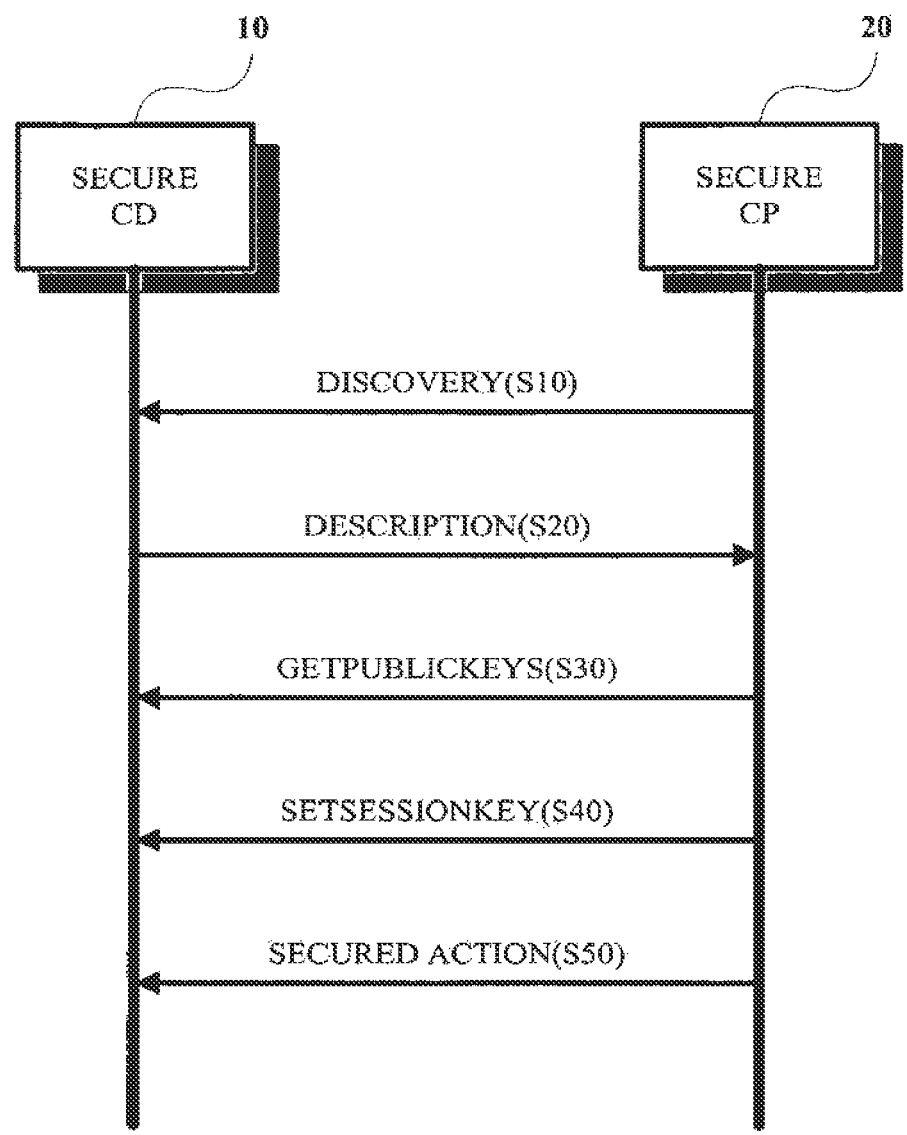

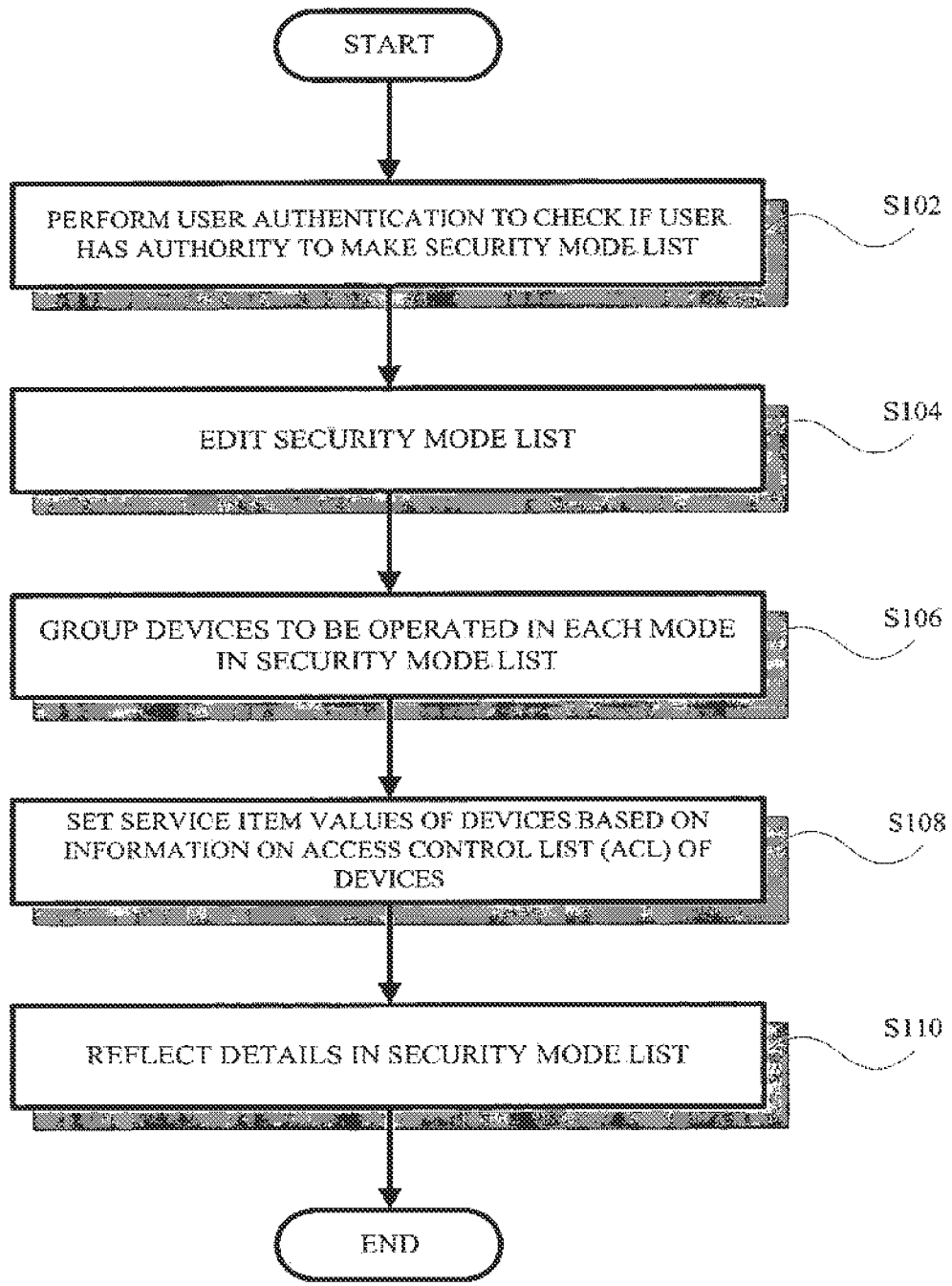

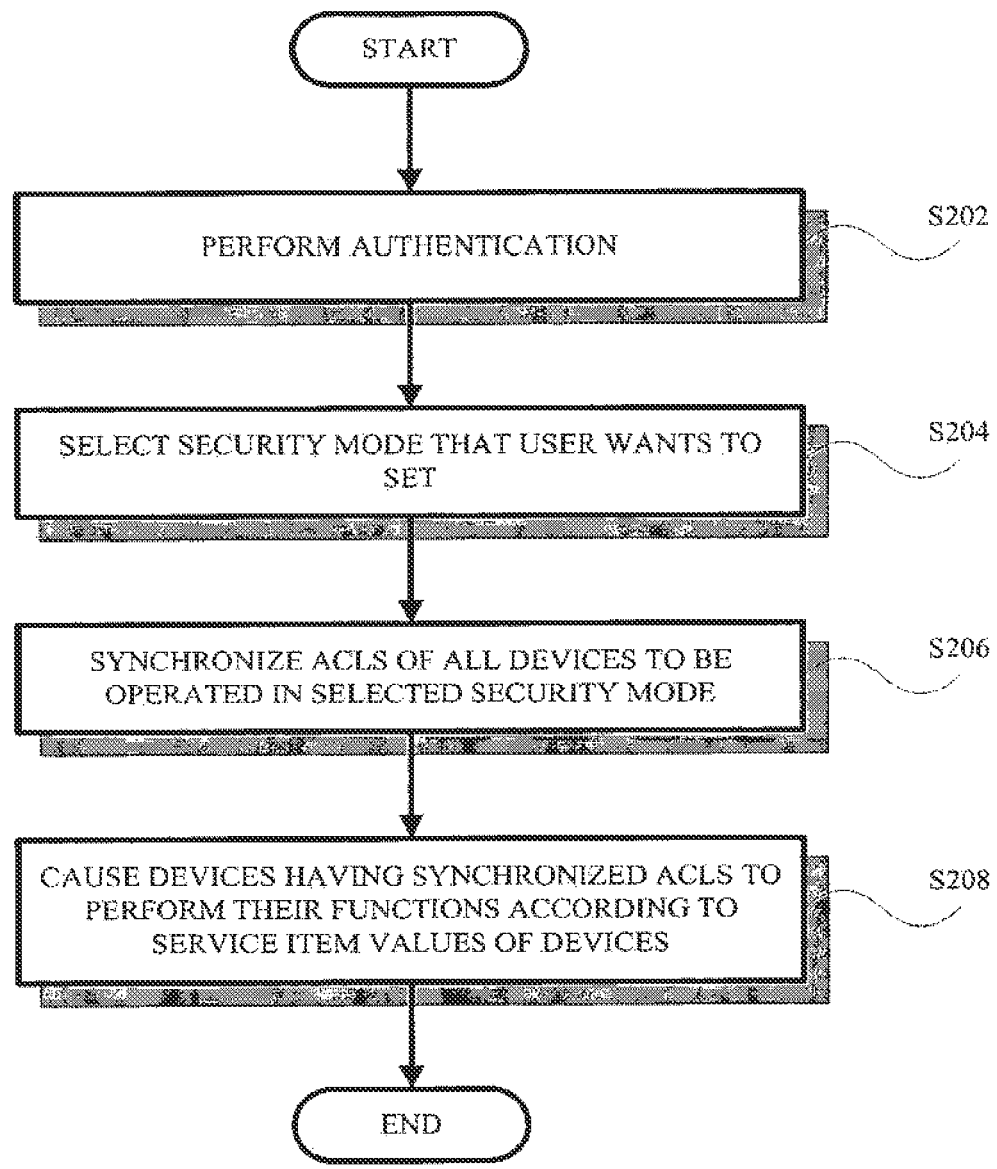

FIG. 8

| SET MODE | USER CONFIGURATION | | |
|---|---|---|---|
| | Parent(host) | child | guest |
| GUEST MODE | o | o | o |
| CHILD MODE | o | o | x |
| GUEST MODE | o | x | o |
| PARENT MODE | o | x | x |
| GUEST MODE | x | o | o |
| CHILD MODE | x | o | x |
| GUEST MODE | x | x | o |

MODE-BASED ACCESS CONTROL METHOD AND DEVICE

CROSS REFERENCE TO RELATED APPLICATION

This application is a Continuation Application of U.S. application Ser. No. 11/500,889, filed Aug. 9, 2006, which claims priority from Korean Patent Application No. 10-2005-0073433 filed on Aug. 10, 2005, in the Korean Intellectual Property Office, the disclosure of which is incorporated herein by reference in its entirety.

BACKGROUND OF THE INVENTION

1. Field of the Invention

Apparatuses and methods consistent with the present invention relate to security setting in a home network environment, and, more particularly, to a mode-based access control method and device that enables security setting according to various modes by a user's (or an administrator's) decision, and allows user-specific access control, and that overcomes the inconvenience of a conventional method of operating security device by device in home network.

2. Description of the Related Art

A home network is characterized by frequent changes of access to home network devices by a host and guests. In general, except in the case of not needing a special security setting, different access levels have to be established according to type of user (e.g., parents, children and guests). For example, parents are allowed to use devices for adult content without limitation, but children have limited or no access to such content, which is decided by parents. Access control is also required for guests, so that some special devices or digital motion pictures limited to family members are not allowed access to. The conventional method for setting the security of a home network is illustrated in FIG. 1A and FIG. 1B.

FIG. 1A is a diagram illustrating the configuration of access control of home network devices according to the related art. A conventional mechanism is described in FIG. 1A, in which a controlled device (hereinafter, referred to as "CD") 10 only allows a control point (hereinafter, referred to as "CP") 20 to control its functions through an access control list (hereinafter, referred to as an "ACL") 10a. A security console (hereinafter, referred to as an "SC") 30 edits ACL 10a of the CD 10 and performs security setting.

FIG. 1B is a diagram illustrating the security operation of home network devices according to the related art. A UPnP system is used as an example of a home network, and a security operation between a secure CD 10 and a secure CP 20 for controlling the secure CD 10 will be described below.

First, a discovery process is performed between the secure CP 20 and the secure CD 10 (S10), which is classified into: an advertise process in which a new secure CD 10 is connected to the home network and introduces itself to other devices over the home network; and a discovery process in which a new secure CP 20 is connected to the home network and searches the secure CDs 10 operating in the home network.

Second, a description process is performed (S20). In this process, in order to control the secure CD 10, the secure CP 20 requests the secure CD 10 to transmit a service description XML file or a device description XML file. After receiving the requested description XML file (UPnP description of a device, UPnP description of a service) from the secure CD 10, the secure CP 20 parses the received file.

Meanwhile, the secure CP 20 acquires a public key from the secure CD 10 (S30), and then sets a session key (S40). Then, the two devices continue to perform their functions under such security conditions S50. That is, since security setting is performed for every device in the home network, the same security setting is maintained regardless of users.

According to the above-mentioned conventional home network security system, the security setting of every home network device has to be re-edited whenever a host having a right to set the services of devices is changed, which is very troublesome and time-consuming.

In addition, an additional process is required to allow home network devices to provide a specific service to a guest device through operative connection to the guest device. However, according to the related art, this process is also troublesome and inconvenient. There are various types of home devices capable of being operatively connected to a guest device. However, in this case, information of the guest device, which is changed whenever a guest accesses the device, has to be mapped to the home network devices in order to edit the ACLs of the devices.

Thus, according to the conventional system, it is difficult for home network users to individually perform security setting, and thus it is necessary to perform security setting such that every home network user can control all home network devices at the same time.

SUMMARY OF THE INVENTION

The present invention is made in view of the above-mentioned problems of the related art, and an aspect of the invention is to provide a mode-based access control method and device capable of simplifying a process of setting the security of various types of home devices and collectively applying to all home network device security setting related to a specific security mode set by a host.

The present invention will not be limited to the above-mentioned aspect. Other aspects not described herein will be more definitely understood by those skilled in the art from the following detailed description.

According to an aspect of the present invention, a mode-based access control method includes: making a security mode list which indicates security setting states of devices existing in a home network; setting a specific security mode selected from the modes on the security mode list; and making the devices perform functions thereof in the specific security mode.

According to another aspect of the present invention, a mode-based access control device includes: an authentication part which checks information on a user and authenticates the user; a mode configuration part which makes a security mode list indicating the security setting state of devices forming a home network; a mode setting part which sets a specific security mode selected from modes on the security mode list; and an operating part which causes the devices to perform functions thereof in the specific security mode. The mode-based access control device may further include a mode converting part which converts the security mode when the authentication of a new user is performed or the authentication of the existing user is released.

BRIEF DESCRIPTION OF THE DRAWINGS

The above aspects and other features and advantages of the present invention will become more apparent by describing in detail exemplary embodiments thereof with reference to the attached drawings in which:

FIG. 1B is a diagram illustrating a security operation between the home network devices according to the related art;

FIG. 4 is a diagram illustrating a security-mode configuring process of a mode-based access control method according to an exemplary embodiment of the present invention;

FIG. 5 is a diagram illustrating a security-mode setting process of a mode-based access control method according to an exemplary embodiment of the present invention;

FIG. 8 is a diagram illustrating a security-mode setting method according to an exemplary embodiment of the present invention.

DETAILED DESCRIPTION OF EXEMPLARY EMBODIMENTS

Figure 1A:
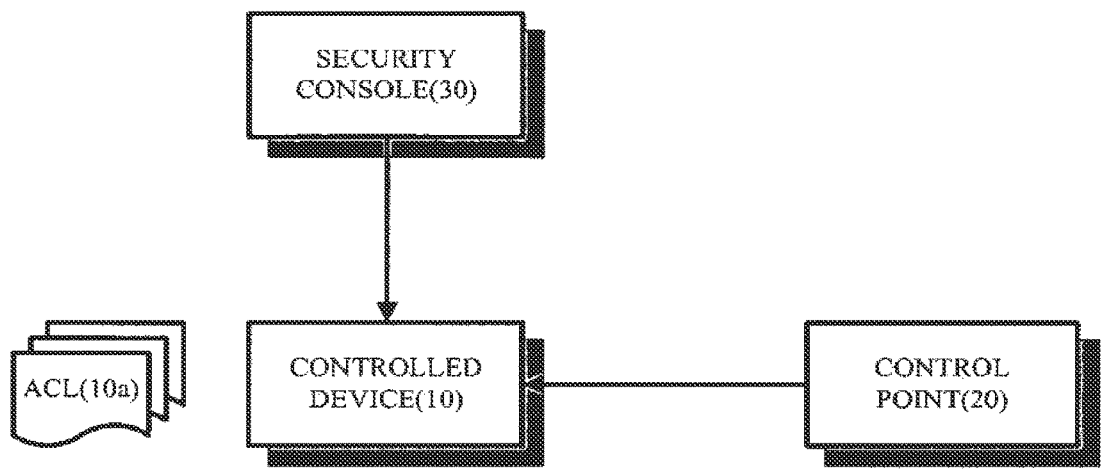
FIG. 1A is a diagram illustrating the configuration of access control for home network devices according to the related art.

Subject matter and features of the exemplary embodiments of the present invention will be covered by the detailed description and accompanying drawings.

Advantages and features of the present invention and methods of accomplishing the same may by understood more readily by reference to the following detailed description of the exemplary embodiments and the accompanying drawings. The present invention may, however, be embodied in many different forms and should not be construed as being limited to the exemplary embodiments set forth herein. Rather, these exemplary embodiments are provided so that this disclosure will be thorough and complete and will fully convey the concept of the invention to those skilled in the art, and the present invention will only be defined by the appended claims. Like reference numerals refer to like elements throughout the specification.

Hereinafter, exemplary embodiments of the present invention will be described in more detail with reference to the accompanying drawings.

Figure 2:
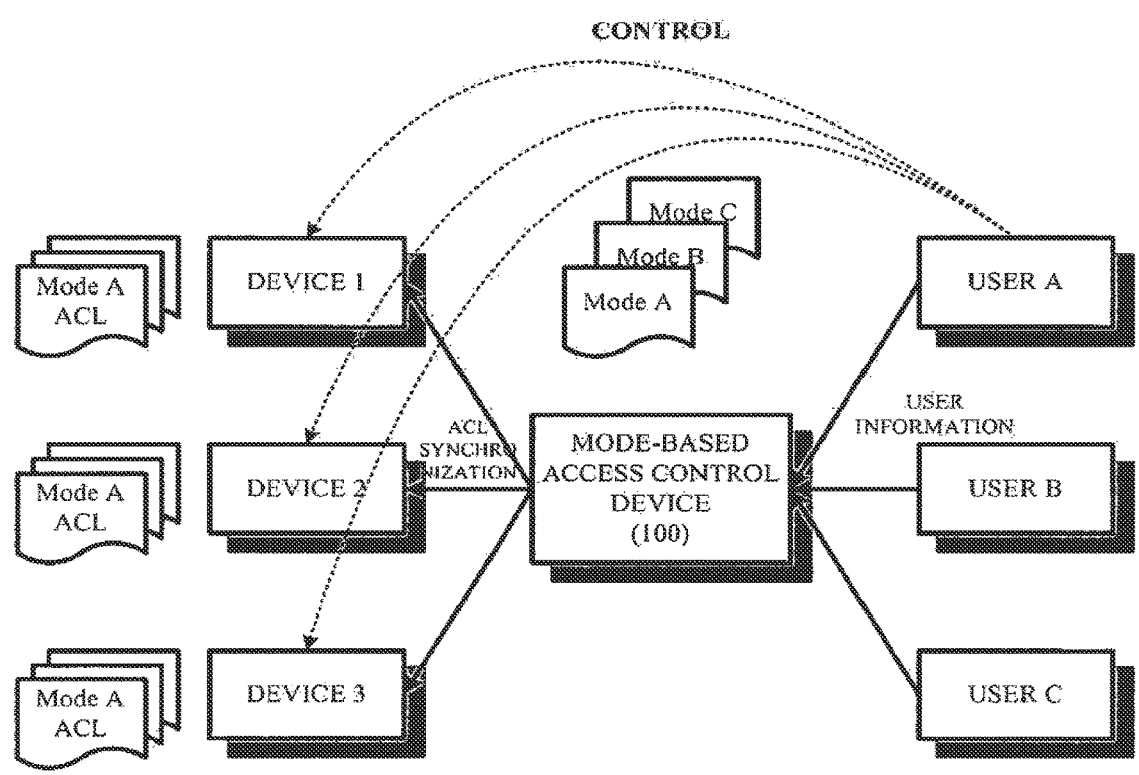
FIG. 2 is a diagram illustrating a home network system including a mode-based access control device according to an exemplary embodiment of the present invention.

FIG. 2 is a diagram illustrating a home network system including a mode-based access control device according to an exemplary embodiment of the present invention. All devices of the system are set in a specific security mode A, with a device 1, a device 2, and device 3 forming a home network system being connected to a user A, a user B, and a user C by a mode-based access control device 100. The mode-based access control device 100 receives information on the users A, B and C, and synchronizes ACLs included in the devices 1, 2, and 3, so the user A who has all access rights in mode A controls device 1, device 2 and device 3.

Figure 3A:
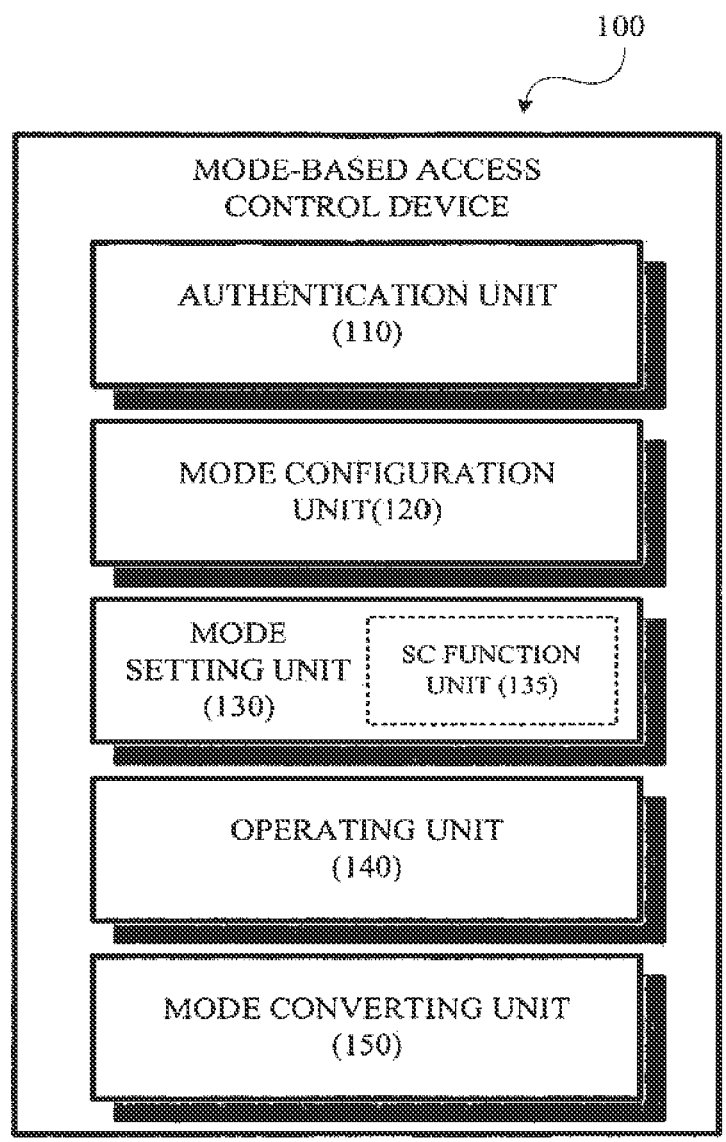
FIG. 3A is a diagram illustrating the configuration of a mode-based access control device according to an exemplary embodiment of the present invention.
Figure 3B:
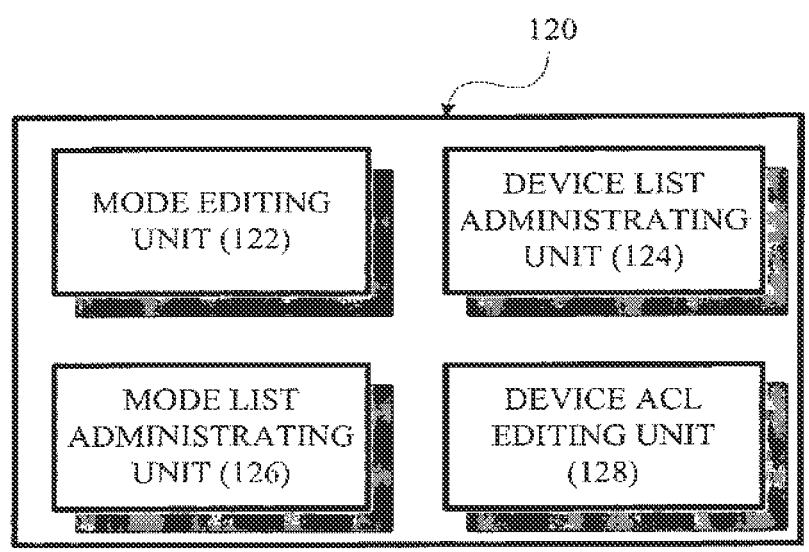
FIG. 3B is a diagram illustrating a mode configuration unit of a mode-base access control device according to an exemplary embodiment of the present invention.

FIG. 3A is a diagram illustrating the configuration of a mode-based access control device according to an exemplary embodiment of the present invention, and FIG. 3B is a diagram illustrating a mode configuration part of the mode-based access control device.

Referring to FIGS. 3A and 3B, the mode-based access control device includes an authentication part 110, a mode configuration unit 120, a mode setting unit 130 including an SC function unit 135, an operating unit 140, and a mode converting unit 150. The mode configuration unit 120 includes a mode editing unit 122, a device list administrating unit 124, a mode list administrating unit 126, and a device ACL editing unit 128.

First, the authentication unit 110 authenticates a user after checking user information. That is, a user needs to be authenticated as a host user who has administration rights for a home network in order to change a mode. The authentication unit 110 checks information of a user who wants to use the mode-based access control device 100 of the invention through a specific device, and when a user is authenticated, it allows the user to operate the device.

The mode configuration unit 120 serves to prepare a security mode list presenting the security setting states of home network devices, which includes four components.

The mode editing unit 122 edits the security mode list by adding a new security mode or removing an old mode. This unit is also a module for changing details of each security mode in the list, and, in particular, different ACL setting details by applicable devices are stored in the security mode.

The device list administrating unit 124 constructs each device corresponding to each security mode in the list. In addition, the device list administrating unit 124 manages information on devices connected to the mode-based access control device 100 of the invention. In particular, when the device information varies, the device list administrating unit 124 updates the device list on the basis of the variation in information.

The device ACL editing unit 128 is a module for collecting ACL information of each device provided by the device list administrating unit 124. Specifically, the device ACL editing unit 128 provides the ACL information of a corresponding device and edits the ACL of the device, in order to set a service item value for the device.

The mode list administrating unit 126 is a module for administrating all lists of modes which are newly created by the host user, including basic security modes (for example, a parent mode, a child mode and a guest mode, which will be described below). The mode list administrating unit 126 reflects ACL information provided by the device ACL editing unit 128 and the edited ACL content to the security mode list.

The service item value for device can be set by: a device-unit-setting method for setting the service items and the conditions of the service items on the basis of the devices; a service-list-unit setting method for setting the conditions of the service items and a list of devices containing the service items, on the basis of the service items included in devices; and a task-unit-setting method for preparing a list of task forming service items on the basis of the task which a host user wants to perform.

The mode setting unit 130 is a module which allows a user to select a specific security mode applicable to all the devices in the home network after user authentication. The mode setting unit 130 sets a specific security mode among those in the security mode list. According to the security mode selected by the mode setting unit 130, ACLs of connected devices are synchronized or changed. The details of the mode selected by mode setting unit 130 are used for the SC function unit 135 to change the ACL of the actual device. Meanwhile, mode setting can be changed either directly by a user or automatically by the task to be performed by the user.

The SC function unit 135 synchronizes the ACLs of all the devices that are in the set security mode. The ACL synchronization should be performed to support a normal operation of devices by reducing memory and CPU usage. That is, the ACL synchronization is performed to prevent deterioration in performance and waste of space due to the storage of multiple ACLs, including members who do not access the network, in a limited memory.

The operating unit 140 allows the devices to perform their functions according to the specific security mode. Specifically, the devices having the ACLs synchronized by the SC function unit 135 perform their functions according to the service item values.

The mode converting unit 150 changes the present security mode if a new user is additionally authenticated or the authentication of the present user is released.

Particularly, under such conditions that all or some of the home network devices are set in the security mode A and are synchronized, if the user B is authenticated and tries to set and synchronize all or some of the home network devices in the security mode A, the mode converting unit 150 compares a priority between the security mode A and the security mode B, resets and synchronizes all or some of the devices in a security mode having a higher mode priority. If the authentication of a user who has reset the security mode having a higher priority is released in the home network, the security mode having a lower priority is automatically reset, and the devices are synchronized.

Figure 6:
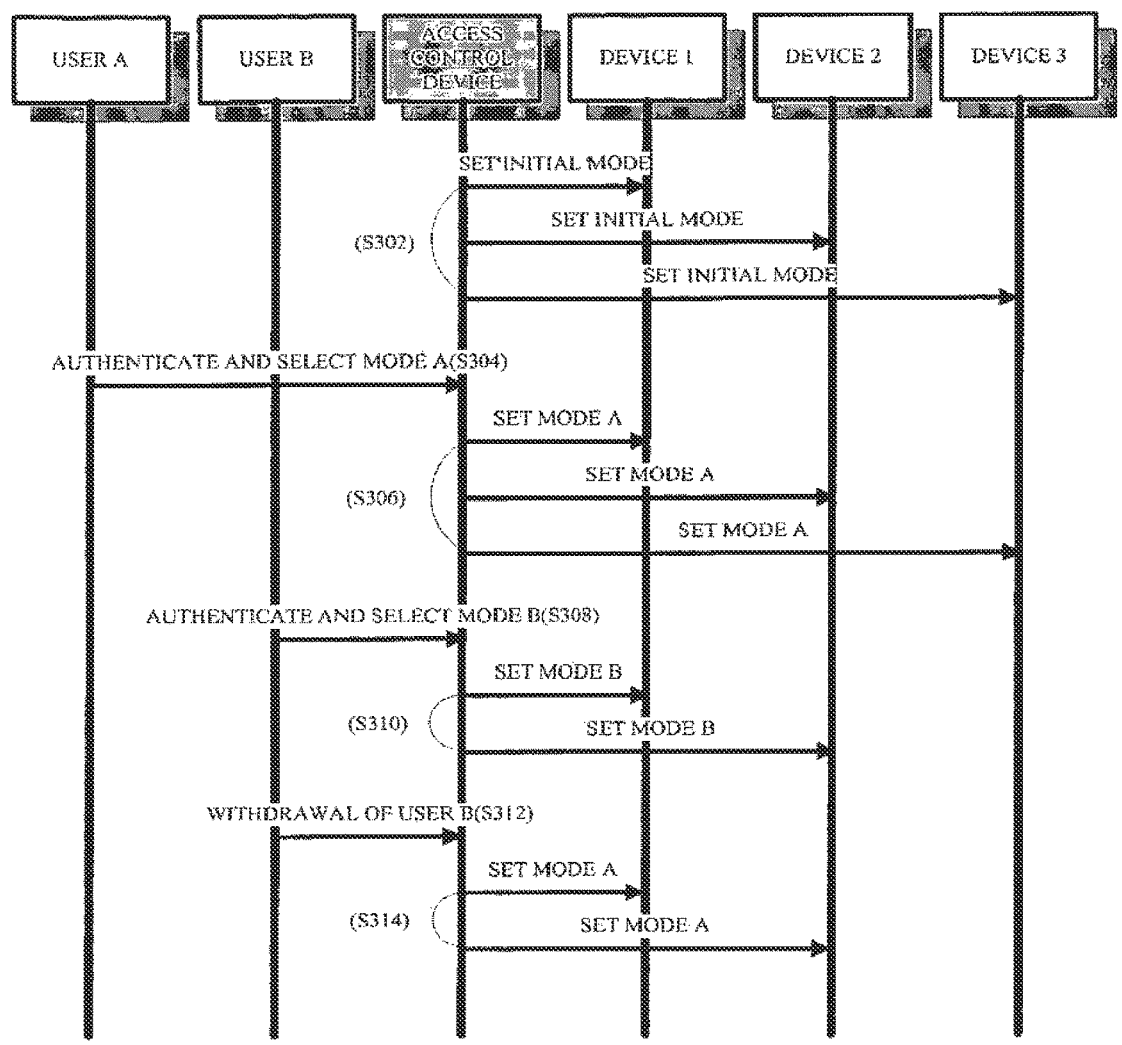
FIG. 6 is a diagram illustrating a security-mode converting process of a mode-based access control method according to an exemplary embodiment of the present invention.

The flow of a mode-based access control method will be described in the following. The flow is divided into: a first step of forming a security mode list representing the security setting states of home network devices; a second step of setting up a specific security mode selected among those in the list; and a third step of making the devices perform their functions in the set specific security mode. The first step is illustrated in FIG. 4, the second step is illustrated in FIG. 5, and the third step is illustrated in FIG. 6.

Further, a fourth step of changing the security mode when the authentication of a new user is performed or when the authentication of the current user is released may be additionally included.

FIG. 4 is a flowchart illustrating a security-mode-configuring process of a mode-based access control method according to an exemplary embodiment of the present invention.

Referring to FIG. 4, the authentication unit 110 authenticates a user after checking if the user has a right to configure a security mode list (S102). After authentication, the mode editing unit 122 adds a new mode to the security mode list or removes an old mode, thereby editing the security mode list (S104). The mode can be added or modified by a host user, and default modes can also be rearranged if necessary. This editing is performed to provide a user environment most suitable for a host user, since the connection types of family members or a third party differs from each other in every home network environment.

The device-list-administrating unit 126 forms a target device group by searching and adding devices corresponding to each mode listed on the security mode list (S106). The device list administrating unit 124 sets the service item value for each device (S108) on the basis of ACL information provided by the device ACL editing unit 128 (S108), which will be reflected in the security mode list again (S110). The service items of a device can be set by: first, a device-unit-setting method for setting the service items and conditions for the service items on the basis of devices; second, a service-list-unit setting method for setting the conditions of the service items and device lists containing the service items on the basis of the service items included in devices; and third, a task-unit-setting method for setting a list of service items forming a task on the basis of the task to be performed by a host user. The device-unit-setting method is described in FIG. 7A, the service-unit-setting method is illustrated in FIG. 7B and the task-unit-setting method is illustrated in FIG. 7C.

Figure 7A:
FIG. 7A, FIG. 7B and FIG. 7C are diagrams respectively illustrating device-unit setting, service-list-unit setting, and task-unit setting of a method of setting service item values of devices according to an exemplary embodiment of the present invention.
Figure 7B:
Figure 7C:
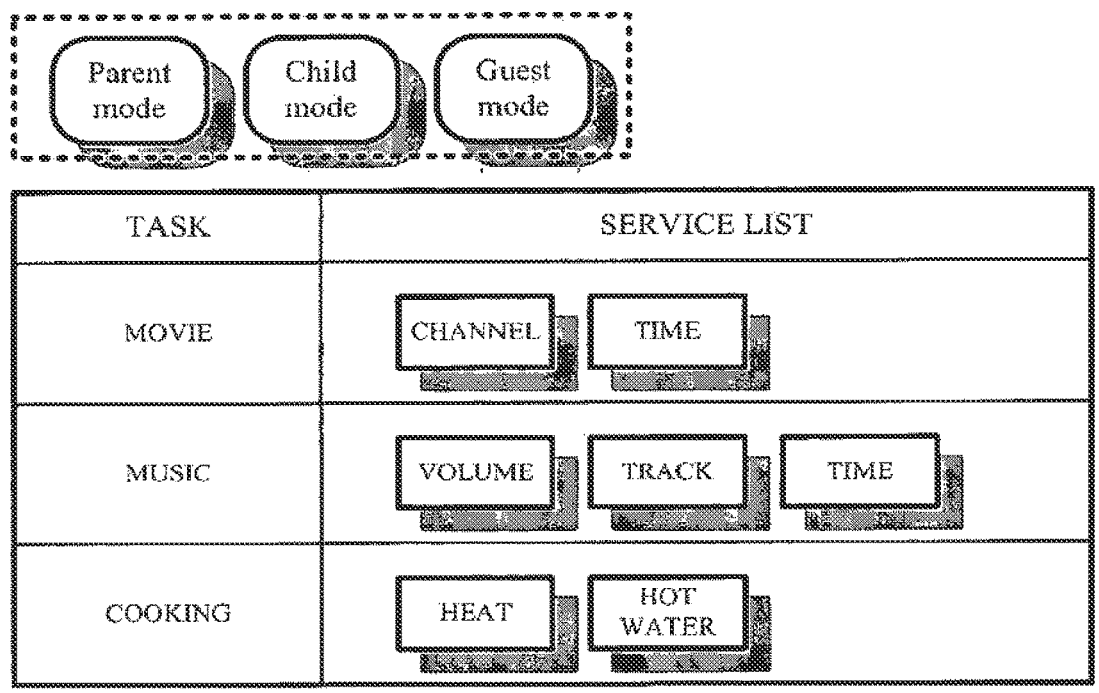

FIGS. 7A, 7B, and 7C are diagrams respectively illustrating three different methods of setting the service item values of a device, that is, the device-unit-setting method, the service-list-unit setting method, and the task-unit-setting method, according to an exemplary embodiment of the present invention.

Referring to FIG. 7A, the device 1 is composed of three service items: an 'adult channel", "time", and a "maximum volume", and the condition values of the service items are also represented. The device 2 is composed of two service items: "power" and "temperature". Referring to FIG. 7B, three service items: "adult channel", "time" and "volume", and the condition values of the service items are listed on the service list. A list of the devices capable of providing the service items is represented on the right side. The service item "adult channel" can be provided by the device 1 and the device 2, the service item "time" can be provided by devices 1 to 3, and the service item "volume" can be provided by device 2 and 3. Referring to FIG. 7C, a service list is made in the task unit set by a user. For example, the service items "channel" and "time" are provided for an item "movie", and service items "volume", "track" and "time" are provided for an item "music". In addition, service items "heat" and "hot water" are provided for an item "cooking".

FIG. 5 is a diagram illustrating a security mode setting process of a mode-based access control method according to an exemplary embodiment of the present invention.

First, the authentication unit 110 checks whether a user has a right to set a security mode (S202), and the mode setting unit 130 selects a security mode that the authenticated user wants to set (S204). In particular, the SC function unit 135 synchronizes ACLs of all the devices that the selected security mode can be applied to (S206). The operating unit 140 causes the devices having the synchronized ACLs to perform their functions according to the service item values (S208).

FIG. 6 is a diagram illustrating a security mode converting process of a mode-based access control method according to an exemplary embodiment of the present invention.

Referring to FIG. 6, there are three devices: a device 1, a device 2 and a device 3, and two users: a user A and a user B. First, the mode-based access control device 100 of the invention sets the devices to an initial mode (S302). Then, when the user A selects a security mode A by using the mode-base access control device 100 after being authenticated (S304), the device 1, the device 2, and the device 3 in the home network are set to the security mode A and then synchronized (S306). Under this circumstance, if the user B selects a mode B by using the mode-based access control device 100 after being authenticated (S308), the mode-based access control device 100 sets the device 1 and the device 2 to the security mode B, and synchronizes the devices 1 and 2 according to the characteristics of the mode (S310). At this time, the mode priorities of security mode A and the security mode B are compared, and then all or some of the devices are re-set to a security mode having a higher priority, and are then synchronized. In FIG. 6, since the mode B has a higher priority, the devices will be reset to mode B, not mode A, even though user B is authenticated later than user A.

The mode priority is determined by the limit of authority of a user allowable between the modes. For example, a user with less authority is more limited in the use of authority, and therefore the mode priority is high. That is, the mode priority is a standard applied for competence among a plurality of modes, and is a variable determining which mode will be selected under the condition of requiring higher security.

Meanwhile, when the authentication of the user B who resets the device to the security mode B with a higher priority is released in the home network (S312), the device is reset to the security mode A, and is then synchronized (S314).

FIG. 8 is a diagram illustrating a security mode setting method according to an exemplary embodiment of the present invention. In the present embodiment of the invention, security modes include a parent mode, a child mode and a guest mode. The parent mode can be set by only a host user who has unlimited authority to access all devices forming a home network. In the child mode, access to some of the devices or some of the services or content provided by the devices is limited. In the guest mode, access to all the devices forming a home network is prohibited except for a host user who is allowed temporary access. Thus, among these three modes, the guest mode has the highest mode priority, followed by the child mode and the parent mode.

For example, when the parent mode and the guest mode are set together, conversion to the guest mode should be performed, so that the security settings of all devices are strict.

Referring to FIG. 8, access authority depends on the security mode. For example, the guest mode has the highest mode priority, and the parent mode has the lowest mode priority, resulting in the structure shown in the table of FIG. 8. In the parent mode, only parents have access authority. In the guest mode, parents and a child can share access authority, or either parents or a child has access authority. In the child mode, only a child user has access authority. If necessary, parents and guests can be granted access authority. The security mode makes it possible to collectively set the security modes of devices while keeping high efficiency.

It should be understood that the scope and spirit of the present invention can also be applied to a computer readable recording medium having therein a program for allowing a computer to execute the method according to the above-described exemplary embodiments of the present invention.

It will be understood by those skilled in the art that various replacements, modifications and changes may be made in the form and details without departing from the spirit and scope of the present invention as defined by the following claims. Therefore, it should be understood that the above-described embodiments are not restrictive, but illustrative in all aspects.

According to an exemplary embodiment of the present invention, it is possible to provide intuitive and united security settings in a home network system. Different security settings are possible based on the characteristics of each user regardless of the variety of security functions provided for every device, which makes it possible to easily control devices operatively connected to each other.

According to another exemplary embodiment of the present invention, it is possible to improve the convenience of use by simplifying the complicated and repeated authentication processes, which means a one time user certificate process is enough for mode conversion in every device, indicating that there is no need for a user to take every authentication process in each device for security mode conversion.

According to still another exemplary embodiment of the present invention, it is possible to prevent waste of resources by synchronizing ACLs and to prevent users other than the present user from accessing devices.

The effects of the present invention are not limited to the exemplary embodiments set forth herein. It is to be understood that other effects of the present invention not described hereinbefore will be defined by the appended claims.

What is claimed is:

1. A mode-based access control method comprising:
    making a security mode list which indicates security setting states of devices existing in a network, wherein the devices contain access control lists, wherein the security mode list comprises a first security mode and a second security mode in which at least one of access and control of the devices is more restrictive than access in the first security mode and which has a higher priority than the first security mode;
    assigning the first security mode to a first user, selected from a plurality of security modes on the security mode list, when the first user accesses the network;
    making the devices perform functions thereof in the first security mode by collectively changing the security setting states of each of the devices based on the first security mode, wherein collectively changing the security setting states comprises synchronizing the access control lists of the devices in accordance with the first security mode, wherein the functions are performed in accordance with the access control lists;
    comparing mode priorities of the first security mode and the second security mode corresponding to a second user, selected from the plurality of security modes on the security mode list when the second user accesses the network while the first user maintains access to the network; and
    converting the first security mode to the second security mode based on a result of the comparing,
    wherein, in the second security mode, at least one of control and access to at least some of the devices is restricted, and
    wherein the priority indicates whether the first security mode or the second security mode is chosen based on the first user and the second user being connected to the network at same time.

2. The mode-based access control method of claim 1, wherein the security mode list comprises:
    a parent mode, which is the first security mode and which is set by only a host user having unlimited authority for access to all the devices forming the network;
    a child mode, which is the second security mode, which is set by a child user having limited authority for access to some of the devices, services or content provided by the devices; and
    a guest mode, which is a third security mode and which is set by a guest user that cannot access all the devices forming the network but who has temporary access granted by the host user, wherein the third security mode has a lower priority than the second security mode.

3. A mode-based access control device comprising:
an authentication unit which checks information on a first user or a second user, and authenticates the first user or the second user;
a mode configuration unit which makes a security mode list indicating security setting states of devices forming a network, if the first user has authority to make the security mode list;
a mode setting unit which sets, according to the user, a specific security mode selected from among a plurality of security modes on the security mode list comprising a first security mode and a second security mode in which at least one of access and control of the devices is more restrictive than access in the first security mode and which has a higher priority than the first security mode, if the second user has authority to set the specific security mode, and collectively changes the security setting states of each of the devices based on the specific security mode;
an operating unit which causes the devices to perform functions thereof in the specific security mode; and
a mode converting unit which compares mode priorities of the security modes and converts all or some of the devices to the security mode having a higher mode priority based on a result of the comparing when both the first user and the second user are authenticated,
wherein the devices contain access control lists,
wherein the mode setting unit comprises a security console function unit that synchronizes the access control lists of the devices in accordance with the specific security mode when the specific security mode is selected,
wherein the operating unit causes the devices to perform functions in accordance with the access control lists,
wherein, in the second security mode, at least one of control and access to at least some of the devices is restricted, and
wherein the priority indicates whether the first security mode or the second security mode is chosen based on the first user and the second user being connected to the network at same time.

4. The mode-based access control device of claim 3, wherein the security mode list comprises:
a parent mode, which is the first security mode and which is set by only a host user having unlimited authority for access to all the devices forming the network;
a child mode, which is the second security mode and which is set by a child user having limited authority for access to some of the devices, services or content provided by the devices; and
a guest mode, which is a third security mode and which is set by a guest user that cannot access all the devices forming the network but who has temporary access granted by the host user.

5. The mode-based access control device of claim 3, wherein the mode configuration unit comprises:
a mode editing unit which edits the security mode list by adding a new security mode to the security mode list, by removing an existing security mode from the security mode list or changing an existing security mode in the security mode list.

6. The mode-based access control method of claim 1, wherein the setting of the first security mode comprises:
performing user authentication to check whether the first user has authority to set the first security mode;
if the first user has authority to set the first security mode, setting the first security mode.

7. A mode-based access control device comprising:
an authentication unit which checks information on a first user or a second user, and authenticates the first user or the second user;
a mode configuration unit which makes a security mode list indicating security setting states of devices forming a network, if the first user has authority to make the security mode list;
a mode setting unit which sets, according to the user, a specific security mode selected from security modes on the security mode list, if the second user has authority to set the specific security mode, and collectively changes the security setting states of each of the devices based on the specific security mode;
an operating unit which causes the devices to perform functions thereof in the specific security mode; and
a mode converting unit which compares mode priorities of the security modes and converts all or some of the devices to the security mode having a higher mode priority based on a result of the comparing when both the first user and the second user are authenticated,
wherein the devices contain access control lists,
wherein the mode setting unit comprises a security console function unit that synchronizes the access control lists of the devices in accordance with the specific security mode when the specific security mode is selected,
wherein the operating unit causes the devices to perform functions in accordance with the access control lists,
wherein the all or some of the devices are subsequently converted back to a prior security mode when the authentication of an existing user with the higher mode priority is released while the authentication of the other existing user is maintained,
wherein the higher mode priority is a more restrictive security mode in which at least one of control and access to at least some of the devices are restricted, and
wherein a security mode with the higher mode priority is selected regardless of which one of the first user and the second user is first authenticated.

* * * * *